(12) United States Patent
Golestaneh et al.

(10) Patent No.: US 9,866,734 B2
(45) Date of Patent: Jan. 9, 2018

(54) SCENE-CHANGE DETECTION USING VIDEO STREAM PAIRS

(71) Applicant: Dolby Laboratories Licensing Corporation, San Francisco, CA (US)

(72) Inventors: Seyedalireza Golestaneh, Sunnyvale, CA (US); Guan-Ming Su, Fremont, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 271 days.

(21) Appl. No.: 14/801,633

(22) Filed: Jul. 16, 2015

(65) Prior Publication Data

US 2016/0065792 A1   Mar. 3, 2016

Related U.S. Application Data

(60) Provisional application No. 62/041,769, filed on Aug. 26, 2014.

(51) Int. Cl.
| | |
|---|---|
| *H04N 5/14* | (2006.01) |
| *G06T 7/00* | (2017.01) |
| *H04N 19/30* | (2014.01) |
| *H04N 19/87* | (2014.01) |

(52) U.S. Cl.
CPC ............. *H04N 5/147* (2013.01); *H04N 19/30* (2014.11); *H04N 19/87* (2014.11)

(58) Field of Classification Search
CPC ........ H04N 5/147; H04N 19/87; H04N 19/30; H04N 5/14; G06T 7/0085; G06T 7/00
USPC .................................................... 375/240.11
See application file for complete search history.

(56) References Cited

U.S. PATENT DOCUMENTS

| | | | |
|---|---|---|---|
| 5,589,884 | A | 12/1996 | Ohguchi |
| 5,617,149 | A | 4/1997 | Lee |
| 5,751,378 | A | 5/1998 | Chen |
| 6,449,392 | B1 | 9/2002 | Divakaran |

(Continued)

FOREIGN PATENT DOCUMENTS

| | | |
|---|---|---|
| JP | 2010-041571 | 2/2010 |
| JP | 2011-205567 | 10/2011 |

(Continued)

OTHER PUBLICATIONS

Korpi-Anttila, Jyrki "Automatic Color Enhancement and Scene Change Detection of Digital Video" Dec. 31, 2002, Licentiate Thesis, Helsinki University of Technology.

(Continued)

*Primary Examiner* — Jay Patel
*Assistant Examiner* — Salame Amr

(57) ABSTRACT

A scene change is determined using a first and a second video signal, each representing the same scene or content, but at a different color grade (such as dynamic range). A set of prediction coefficients is generated to generate prediction signals approximating the first signal based on the second signal and a prediction model. A set of prediction error signals is generated based on the prediction signals and the first signal. Then, a scene change is detected based on the characteristics of the prediction error signals. Alternatively, a set of entropy values of the difference signals between the first and second video signals are computed, and a scene change is detected based on the characteristics of the entropy values.

15 Claims, 3 Drawing Sheets

(56) References Cited

U.S. PATENT DOCUMENTS

| | | |
|---|---|---|
| 6,885,773 B2 | 4/2005 | Kimura |
| 6,959,044 B1 | 10/2005 | Jin |
| 7,558,424 B2 | 7/2009 | Yamazaki |
| 7,574,019 B2 | 8/2009 | Mittal |
| 8,731,287 B2 | 5/2014 | Su |
| 8,811,490 B2 | 8/2014 | Su |
| 8,897,581 B2 | 11/2014 | Su |
| 9,035,965 B2 | 5/2015 | Longhurst |
| 9,066,070 B2 | 6/2015 | Su |
| 2008/0101707 A1* | 5/2008 | Mukherjee .......... H04N 19/105 382/236 |
| 2008/0122922 A1* | 5/2008 | Geng ................ G08B 13/19628 348/39 |
| 2009/0141178 A1 | 6/2009 | Kerofsky |
| 2010/0272172 A1* | 10/2010 | Chiba .................... H03M 7/40 375/240.02 |
| 2010/0296579 A1* | 11/2010 | Panchal ............... H04N 19/172 375/240.15 |
| 2011/0261879 A1 | 10/2011 | Bock |
| 2011/0293190 A1 | 12/2011 | O'Callaghan |
| 2011/0317072 A1 | 12/2011 | Miyachi |
| 2013/0148029 A1 | 6/2013 | Gish |
| 2013/0163666 A1* | 6/2013 | Leontaris ......... H04N 19/00569 375/240.12 |
| 2013/0177066 A1 | 7/2013 | Ye |
| 2014/0037206 A1* | 2/2014 | Newton ............... H04N 19/597 382/166 |
| 2014/0105289 A1 | 4/2014 | Su |
| 2015/0086067 A1* | 3/2015 | Mehta .................. G06T 1/0071 382/100 |

FOREIGN PATENT DOCUMENTS

| | | |
|---|---|---|
| WO | 2013/067101 | 5/2013 |
| WO | 2013/138127 | 9/2013 |
| WO | 2014/043005 | 3/2014 |
| WO | 2014/107255 | 7/2014 |

OTHER PUBLICATIONS

Kum-Su Choi, et al "A Effective Algorithm for the Scene Change Detection on Compressed Video" Dec. 31, 2004, International Technical Conference on Circuits Systems, Computers and Communications.

* cited by examiner

SCENE-CHANGE DETECTION USING VIDEO STREAM PAIRS

CROSS REFERENCE TO RELATED APPLICATIONS

This application claims the benefit of priority to U.S. Provisional Patent Application Ser. No. 62/041,769, filed on Aug. 26, 2014, which is hereby incorporated by reference in its entirety for all purposes.

TECHNOLOGY

The present invention relates generally to images. More particularly, an embodiment of the present invention relates to scene-change detection using video stream pairs, wherein each stream in a pair is representing the same scene but is coded at a different color grade.

BACKGROUND

Video signals may be characterized by multiple parameters, such as bit-depth, color space, color gamut, and resolution. Modern televisions and video playback devices (e.g., Blu-ray players) support a variety of resolutions, including standard-definition (e.g., 720×480i) and high-definition (HD) (e.g., 1920×1080p). Ultra high-definition (UHD) is a next generation resolution format with at least a 3,840×2,160 resolution (referred to as 4K UHD) and options to go as high as 7680×4320 (referred to as 8K UHD). Ultra high-definition may also be referred to as Ultra HD, UHDTV, or super high-vision. As used herein, UHD denotes any resolution higher than HD resolution.

Another aspect of a video signal's characteristic is it dynamic range. Dynamic range (DR) is a range of intensity (e.g., luminance, luma) in an image, e.g., from darkest darks to brightest brights. As used herein, the term 'dynamic range' (DR) may relate to a capability of the human psychovisual system (HVS) to perceive a range of intensity (e.g., luminance, luma) in an image, e.g., from darkest darks to brightest brights. In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the human visual system (HVS). For example, well adapted humans with essentially normal vision (e.g., in one or more of a statistical, biometric or ophthalmological sense) have an intensity range that spans about 15 orders of magnitude. Adapted humans may perceive dim light sources of as few as a mere handful of photons. Yet, these same humans may perceive the near painfully brilliant intensity of the noonday sun in desert, sea or snow (or even glance into the sun, however briefly to prevent damage). This span though is available to 'adapted' humans, e.g., those whose HVS has a time period in which to reset and adjust.

In contrast, the DR over which a human may simultaneously perceive an extensive breadth in intensity range may be somewhat truncated, in relation to HDR. As used herein, the terms 'enhanced or extended dynamic range' (EDR), 'visual dynamic range,' or 'variable dynamic range' (VDR) may individually or interchangeably relate to the DR that is simultaneously perceivable by a HVS. As used herein, EDR may relate to a DR that spans 5-6 orders of magnitude. Thus while perhaps somewhat narrower in relation to true scene referred HDR, EDR nonetheless represents a wide DR breadth. As used herein, the term 'simultaneous dynamic range' may relate to EDR.

In practice, images comprise one or more color components (e.g., luma Y and chroma Cb and Cr) wherein each color component is represented by a precision of n-bits per pixel (e.g., n=8). Using linear luminance coding, images where n<8 (e.g., color 24-bit JPEG images) are considered images of standard dynamic range, while images where n>8 may be considered images of enhanced dynamic range. EDR and HDR images may also be stored and distributed using low bit-depth, non-linear luminance coding (e.g., 10-bits and logarithmic luminance coding), or high-precision (e.g., 16-bit) floating-point formats, such as the OpenEXR file format developed by Industrial Light and Magic.

To support backwards compatibility with legacy playback devices as well as new HDR or UHD display technologies, multiple layers may be used to deliver UHD and HDR (or EDR) video data from an upstream device to downstream devices. Given such a multi-layer stream, legacy decoders may use the base layer to reconstruct an HD SDR version of the content. Advanced decoders may use both the base layer and the enhancement layers to reconstruct an UHD EDR version of the content to render it on more capable displays. Such coding system may require updating coding parameters at multiple coding intervals, such as a coded region, frame, scene, or a group of scenes. As used herein, the terms "scene" or "shot" of a video sequence may relate to a series or a group of consecutive frames in the video signal sharing similar characteristics (e.g., colors, dynamic range, and the like.) As appreciated by the inventors here, improved techniques for scene-change or scene-cut detection in video are desirable.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Figure 1:
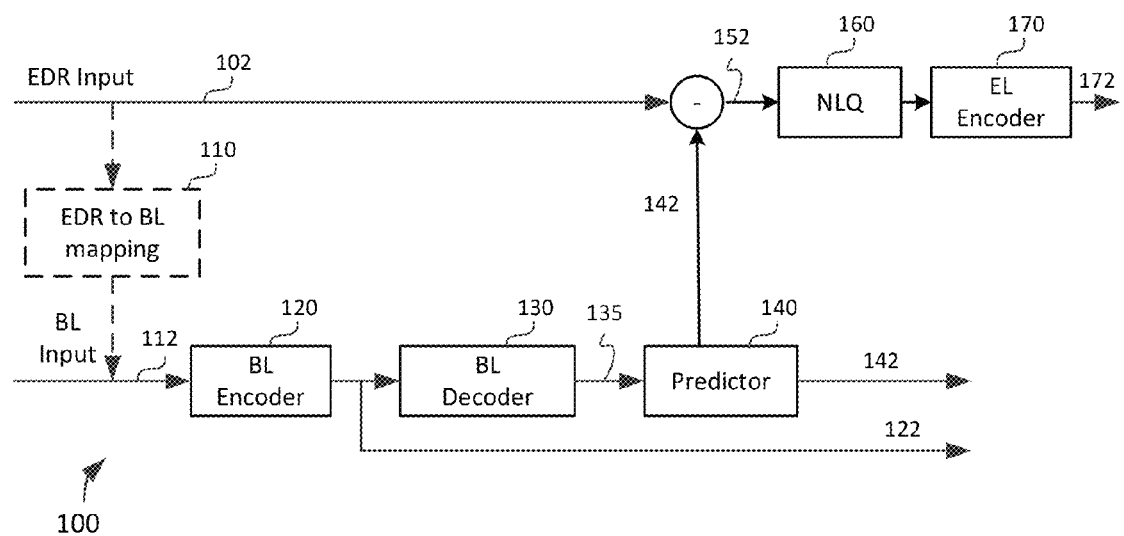
FIG. 1 depicts an example implementation of a layered EDR coding system according to an embodiment of this invention.

Scene-change detection using a pair of video signals, where each signal in the pair represents the same scene but is color graded differently, is described herein. For example, given a pair of input video signals, each coded at a different dynamic range, scene-change detectors are constructed based on either the characteristics of prediction errors (where one signal in the pair is predicted based on the other signal in the pair) or the characteristics of entropy measures of the difference between the two signals, or a combination of the two schemes.

In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily obscuring the present invention.

Overview

Example embodiments described herein relate to scene-change detection of video signals. A scene change or scene cut is determined using a first and a second video signal, each representing the same scene or content, but at a different color grade (e.g., using different dynamic ranges). Given one or more prediction models to predict the first signal based on the second signal, a set of prediction coefficients is computed to generate prediction signals approximating the first signal based on the second signal. A set of prediction error signals is generated based on the prediction signals and the first signal. Then, a scene change is detected based on the characteristics of the prediction error signals.

In another embodiment, a set of entropy values of the difference signals between the first and second video signals are computed, and a scene change is detected based on the characteristics of the entropy values.

Layered Encoding of EDR Signals

Existing display and play-back devices, such as HDTVs, set-top boxes, or Blu-ray players, typically support signals of up to 1080p HD resolution (e.g., 1920×1080 at 60 frames per second). For consumer applications, such signals are now typically compressed using a bit-depth of 8 bits per pixel per color component in a luma-chroma color format where typically the chroma components have a lower resolution than then luma component (e.g., the YCbCr or YUV 4:2:0 color format). Because of the 8-bit depth and the corresponding low dynamic range, such signals are typically referred to as signals with standard dynamic range (SDR).

As new television standards are being developed, such as Ultra High Definition (UHD), it may be desirable to encode signals with enhanced resolution and/or enhanced dynamic range in a format that both legacy HDTV decoders and newer UHD decoders can process. Furthermore, existing or old content may be available in multiple color grades, each color grade targeting a specific set of target displays (e.g., SDR cinema, HDR cinema, HDR TVs, SDR TVs, and the like.) As used herein, the term 'color grading' denotes the process of altering the color characteristics of an image or video signal. As an example, using the characteristics of a target display, for each scene, the colors of each frame may be adjusted by a color grader to match a desired "look" or "feel" according to the director's intent.

FIG. 1 depicts an embodiment of an example implementation of a system supporting coding of video signals with enhanced dynamic range (EDR). The encoder comprises a base layer (BL) Encoder (120) and an enhancement layer (EL) encoder (170). In an embodiment, BL Encoder (120) may comprise a new standards-based encoder, such as an HEVC encoder, while the EL Encoder may be a legacy encoder, such as an AVC (or H.264) encoder. However, this system is applicable to any combination of either known or future encoders, whether they are standard-based or proprietary.

In some embodiments, a base layer and one or more enhancement layers may be used, for example by an upstream device (e.g., an EDR image encoder 100 of FIG. 1), to deliver EDR image data in one or more video signals (or coded bit-streams) to a downstream device. The coded image data may comprise base layer image data (112) of a lower bit depth (e.g., 8-bit or 10-bit), quantized from a higher bit depth (e.g., 12 or more bits) EDR Input image (102) and carried in a coded base layer image container (122), and an enhancement layer image data (172) comprising residual values between the EDR image (102) and predicted image data (142) generated from the base layer image data. The base layer image data and the enhancement layer image data may be received and used by the downstream device (e.g., a set-top box) to reconstruct an EDR output which is a close approximation of the input EDR image (102).

In some embodiments, the coded base layer image data (122) may not be backward compatible to legacy coded SDR formats; instead, the base layer image data, together with the enhancement layer image data, is optimized for reconstructing high quality EDR images for viewing on EDR displays.

FIG. 1 depicts a layered EDR encoder architecture in accordance with an example embodiment. In an embodiment, all video coding in the base and enhancement coding layers may be performed in the YCbCr 4:2:0 color space. The EDR image encoder (100) may be implemented by one or more computing devices.

The EDR image encoder (100) is configured to receive a high-resolution (e.g., UHD) input EDR image (102). As used herein, an "input EDR image" refers to an enhanced or high dynamic range image data (e.g., raw image data captured by a high-end image acquisition device and the like) that may be used to derive an EDR version of the input image. The input EDR image (102) may be in any color space that supports a high dynamic range color gamut. In an embodiment, the input EDR image is a 16-bit YCbCr image, which may have been originally in the RGB space. As used herein, for an image with multiple color components (e.g., RGB or YCbCr), the term n-bit image (e.g., 12-bit or 8-bit image) denotes an image where each pixel of its color components is represented by an n-bit pixel. For example, in an 8-bit RGB image, each pixel comprises of three color components, each color component (e.g., R, G, or B) is represented by 8-bits, for a total of 24 bits per color pixel.

Each pixel may optionally and/or alternatively comprise up-sampled or down-sampled pixel values for one or more of the channels in the color space. It should be noted that in some embodiments, in addition to three primary colors such as red, green and blue, different primary colors may be concurrently used in a color space as described herein, for example, to support a wide color gamut; in those embodiments, image data as described herein includes additional pixel values for those different primary colors and may be concurrently processed by techniques as described herein.

BL Input (112) represents the same scene as EDR Input (102), but may be color graded for a different dynamic range (e.g., a standard dynamic range). BL Input (112) may have been derived through a manual, automatic or semi-automatic mapping of the original EDR Input (102) to a signal of a lower dynamic range. In an embodiment, BL Input (112) may be generated using input from a human color grader so that the BL input maintains the director's intent for the look and feel of a scene while it maximizes the dynamic range and color gamut of the BL input for a target display. An example of a computer-assisted EDR to BL mapping process is described in PCT Application with Ser. Number PCT/US2012/062932 (the '932 application), filed on Nov. 1, 2012, titled "Layer decomposition in hierarchical VDR coding," by G-M. Su et al., which is incorporated herein by reference in its entirety.

In some embodiments, it may be that BL Input (112) represents a legacy SDR representation of a video signal and that the EDR Input (102) may represent an approximation of the same signal in the EDR domain, which is generated either manually (e.g., using a color grader), or automatically (e.g., via a predictor or other means).

BL image encoder (120) is configured to encode/format the BL image (112) to generate a coded (or compressed) BL image (122). In some embodiments, the image data in the base layer image container is not for producing BL images optimized for viewing on SDR displays; rather, the image data in the base layer image container is optimized to contain an optimal amount of base layer image data in a lower bit depth image container for the purpose of minimizing an overall bit requirement for the coded EDR image and to improve the overall quality of the final decoded image. BL encoder may be any of the known video encoders, such as those specified by the ISO/IEC MPEG-2, MPEG-4, part 2, H.264, or HEVC standards, or other encoders, such as Google's VP8, Microsoft's VC-1, and the like.

BL decoder (130) in the EDR image encoder (100) decodes the image data in the base layer image container into a decoded base layer image (135). Signal (135) represents the decoded BL as will be received by a compliant receiver. The decoded base layer image (135) is different from the BL image (112), as the decoded base layer image comprises coding changes, rounding errors and approximations introduced in the encoding and decoding operations performed by the BL encoder (120) and the BL decoder (130).

Predictor process (140) performs one or more operations relating to predicting EDR signal (102) based on the decoded BL stream (135) (or in some embodiments, the BL signal (112)). The predictor (140) attempts to implement the reverse of the EDR to BL mapping (110). Example embodiments of such a predictor are described in the '932 PCT application and in PCT Application with Ser. No. PCT/US2012/033,605, filed on Apr. 13, 2012, and titled "Multiple color channel multiple regression predictor," by G-M. Su et al., which is incorporated herein by reference in its entirety. The predictor output (142) is subtracted from the EDR input (102) to generate residual (152).

In some embodiments, the residual image (152) may be processed by an enhancement layer quantizer (NLQ) (160) which is configured to quantize the EDR residual values (152) from a high bit-depth digital representation (e.g., 16 bits) to a lower digital representation (e.g., 8-bits) using an NLQ function determined by one or more NLQ parameters. The NLQ function may be linear, piece-wise linear, or non-linear. Examples of non-linear NLQ designs are described in PCT application PCT/US2012/034747, "Non-linear VDR residual quantizer," filed Apr. 24, 2012, by G-M Su et al., which is incorporated herein by reference in its entirety.

Enhancement layer (EL) encoder (170) is configured to encode the residual values in an enhancement layer image container to generate the coded EL stream (172). EL encoder (170) may be any of the known video encoders, such as those specified by the ISO/IEC MPEG-2, MPEG-4, part 2, H.264, or HEVC standards, or other encoders, such as Google's VP8, Microsoft's VC-1, and the like. EL and BL encoders may be different or they may be the same.

The set of parameters used in EDR to BL mapping (110), the predictor (140), and NLQ (160) may be transmitted to a downstream device (e.g., an EDR image decoder) as a part of supplemental enhancement information (SEI) or other similar metadata carriages available in video bitstreams (e.g., in the enhancement layers) as metadata (142). As defined herein, the term "metadata" may relate to any auxiliary information that is transmitted as part of the coded bit-stream and assists a decoder to render a decoded image. Such metadata may include, but are not limited to, information as: color space or gamut information, dynamic range information, tone mapping information, or other predictor, up-scaling, and quantizer operators, such as those described herein.

After generating all parts of the layered EDR stream, the coded EL stream (172), the coded BL stream (122), and related metadata are multiplexed and packetized so that they can be stored in a storage medium and/or be transmitted to a decoder.

BL to EDR Prediction

Let $s_{ji}$, denote the i-th pixel at frame j of BL Input (112). Let $v_{ji}$ denote the corresponding co-located pixel at frame j of EDR signal (102). Let $\hat{v}_{ji}$ denote the corresponding co-located predicted EDR pixel at frame j of the output (142) of the predictor (140). Without loss of generality, for the j-th frame, the predicted pixel values can be expressed as $$\hat{v}_j = S_j m_j, \quad (1)$$

where, $m_j$ represents a vector of the prediction coefficients according to a prediction model, and $S_j$ represents an array of input data generated according to the prediction model. For example, without loss of generality, using a 2d-order polynomial model, expressed as $$\hat{v}_{ji} = m_{j0} + m_{j1} \cdot s_{ji} + m_{j2} \cdot (s_{ji})^2, \quad (2)$$

then $$\hat{v}_j = \begin{bmatrix} \hat{v}_{j0} \\ \hat{v}_{j1} \\ \hat{v}_{j2} \\ \vdots \\ \hat{v}_{j,P-1} \end{bmatrix}, S_j = \begin{bmatrix} 1 & s_{j0} & s_{j0}^2 \\ 1 & s_{j1} & s_{j1}^2 \\ 1 & s_{j2} & s_{j2}^2 \\ \vdots & \vdots & \vdots \\ 1 & s_{j,P-1} & s_{j,P-1}^2 \end{bmatrix}, \text{and } m_j = \begin{bmatrix} m_{j0} \\ m_{j1} \\ m_{j2} \end{bmatrix},$$

where P denotes the total number of pixels in the given picture.

Using a least-squares approximation, which minimizes the mean squares error (MSE) of prediction error $\|v_j - \hat{v}_j\|^2$, the prediction coefficients may be generated as $$m_j = ((S_j)^T (S_j))^{-1} ((S_j)^T v_j) \quad (3)$$

where $v_j$ denotes the original EDR pixel values (102).

For notational convenience, let $$B_j = (S_j)^T (S_j),$$

and $$c_j = (S_j)^T v_j. \quad (4)$$

In some embodiments, a more accurate predictor $m_j$ may be obtained if one applies the prediction model of equation (1) across a sliding window of W consecutive frames (e.g., W=4). Given $$B_{j-W+1,j} = [(S_{j-W+1})^T \ (S_{j-W+2})^T \ \ldots \ (S_j)^T] \begin{bmatrix} S_{j-W+1} \\ S_{j-W+2} \\ \vdots \\ S_j \end{bmatrix} \quad (5)$$

$$= (S_{j-W+1})^T S_{j-W+1} + (S_{j-W+2})^T S_{j-W+2} + \ldots (S_j)^T S_j$$

$$= \sum_{i=j-W+1}^{j} (S_i)^T S_i$$

$$= \sum_{i=j-W+1}^{j} B_i,$$

and $$c_{j-W+1,j} = [(S_{j-W+1})^T \ (S_{j-W+2})^T \ \ldots \ (S_j)^T] \begin{bmatrix} v_{j-W+1} \\ v_{j-W+2} \\ \vdots \\ v_j \end{bmatrix}$$

$$= (S_{j-W+1})^T v_{j-W+1} + (S_{j-W+2})^T v_{j-W+2} + \ldots (S_j)^T v_j$$

$$= \sum_{i=j-W+1}^{j} (S_i)^T v_i$$

$$= \sum_{i=j-W+1}^{j} c_i,$$

then Table 1 shows in pseudo code an example process to iteratively generate the prediction coefficients according to an embodiment.

TABLE 1

Example iterative predictor solver for sliding window W

```
// for frame 0
    B_0 = (S_0)^T (S_0)
    c_0 = (S_0)^T v_0
    m_0 = (B_0)^{-1} c_0
// for the rest of frames still within the same scene with F consecutive
frames
for ( j = 1; j < F; j ++ ) {
//     calculate matrix
    B_j = (S_j)^T (S_j)
    c_j = (S_j)^T v_j
// calculate predictor coefficients
    a = max{ j - W + 1, 0 };

B_{a,j} = sum_{i=a}^{j} B_i c_{a,j} = sum_{i=a}^{j} c_i m_{a,j} = (B_{a,j})^{-1} c_{a,j}
}
```

In Table 1, $m_{a,j}$ denotes a predictor solution utilizing input data from frame a to j, e.g., using a sliding window of $j-a+1=W$ frames. The number F of frames in a scene is typically unknown and has to be estimated using a scene-change detector.

Scene-Change Detection Based on the Prediction Error

Let $$\hat{v}_{j-1,k} = S_k m_{W,j-1} \quad (6)$$

denote a predicted frame using a window-based predictor generated with data up to frame j−1, but applied to frame k, and let $$D_{j-1,k} = \|\hat{v}_{j-1,k} - v_k\|^2, \quad (7)$$

denote the corresponding prediction error or distortion for the k-th EDR frame. If there is a scene cut between two consecutive frames, say between frames j and j−1, then the expectation is that there should be a sudden increase in measured distortion, or $$D_{j-1,j-1} < D_{j-1,j}. \quad (8)$$

Consider now a sequence of frames in the range [j−a, j+b]. If there is no scene change between frames j−a and j+b, then the expectation is that there should be little change in distortion, or $$D_{j-1,j-a} \approx D_{j-1,j-a+1} \approx \ldots \approx D_{j-1,j-1} \approx D_{j-1,j} \approx$$
$$D_{j-1,j+1} \approx \ldots \approx D_{j-1,j+b}. \quad (9)$$

However, if there is scene change between frames j−1 and j, then one should observe $$D_{j-1,j-a} \approx D_{j-1,j-a+1} \approx \ldots \approx D_{j-1,j-1}$$

$$D_{j-1,j} \approx D_{j-1,j+1} \approx \ldots \approx D_{j-1,j+b}$$

$$D_{j-1,j-1} < D_{j-1,j}$$

Figure 2A:
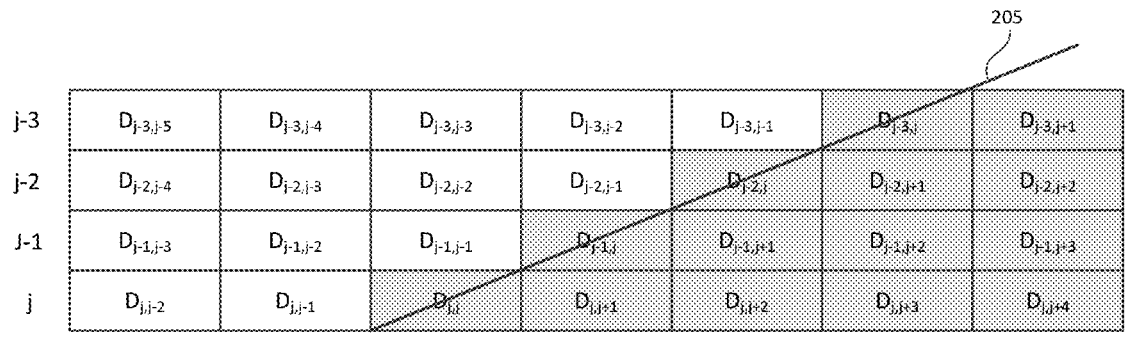
FIG. 2A and FIG. 2B depict examples of prediction error data flows to be used for scene change detection according to embodiments of this invention.

Similar results can also be observed when comparing $D_{j,j-a}$, $D_{j,j-a+1}, \ldots, D_{j,j}, \ldots, D_{j,j+b}$, or when extending the distortion values (e.g., of equation (9)) as a waterfront approach across several sliding windows. FIG. 2A depicts such an example with a=3 and b=3. In FIG. 2A, a change (205) from clear values to shaded values indicates a sudden change in distortion and most likely a scene change.

Scene-Detection Criteria

Given an array of prediction errors $D_{i,k}$ as depicted in FIG. 2A, the problem of scene detection may be considered equivalent to the problem of edge detection, i.e., detecting edge (205). Edge detection can be performed using simple one-dimensional (1-D) criteria or more complex, but also potentially more accurate, two-dimensional (2-D) criteria. For example, in FIG. 2A, consider the j−1-th row, indicating prediction errors computed across frames j−3 to j+3 using a prediction model computed with data up to frame j−1. If there is a scene cut between frames j−1 and j, then one should detect a change in the first derivative of the distortion values ($D_{i,k}$)

For example, let $$M_L = \frac{1}{a} \sum_{i=-a}^{-1} D_{j-1,j+i}, \quad (10)$$

and $$M_R = \frac{1}{b+1} \sum_{i=0}^{b} D_{j-1,j+i}. \quad (11)$$

In an embodiment, one criterion for scene change detection is to compute whether $$\theta_1 = \frac{|M_L - M_R|}{\min\{M_L, M_R\}} > T_{ave} \quad (12)$$

is true, where $T_{ave}$ is a threshold parameter (e.g., $T_{ave}=0.1$).

Consider now a 2-D edge detection criterion. In an embodiment, a scene cut may be present when the following criterion of prediction differences across a potential scene change (205) at frame j is satisfied $$|D_{j-3,j-1}-D_{j-3,j}|>\max\{|D_{j-3,j-2}-D_{j-3,j-1}|,|D_{j-3,j}-D_{j-3,j+1}|\}$$

$$\&\& \ |D_{j-2,j-1}-D_{j-2,j}|>\max\{|D_{j-2,j-2}-D_{j-2,j-1}|,|D_{j-2,j}-D_{j-2,j+1}|\}$$

$$\&\& \ |D_{j-1,j-1}-D_{j-1,j}|>\max\{|D_{j-1,j-2}-D_{j-1,j-1}|,|D_{j-1,j}-D_{j-1,j+1}|\}$$

$$\&\& \ |D_{j,j-1}-D_{j,j}|>\max\{|D_{j,j-2}-D_{j,j-1}|,|D_{j,j}-D_{j,j+1}|\}. \quad (13)$$

This criterion identifies an edge if for one or more sets of prediction coefficients (e.g., $m_{j-W+1,j}$, $m_{j-W,j-1}$, $m_{j-W-1,j-2}$, and $m_{j-W-2,j-3}$), the difference of distortion values at the estimated scene change (e.g., between frames j−1 and j) is larger than the difference of neighboring distortion values at the left and the right of the estimated scene change (e.g., between frames j−2 and j−1 or frames j and j+1). In some embodiments, to reduce the computation cost, the criterion of equation (13) may be applied to fewer than four rows (e.g., row j−1 only, or rows j−1 and j−2 only, and the like).

Figure 2B:
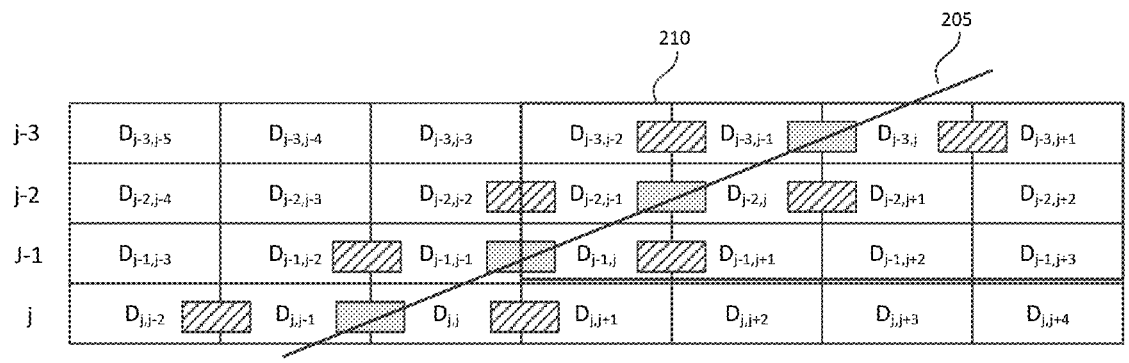

Consider again the prediction errors $D_{i,k}$ depicted in FIG. 2B for a hypothetical scene change between frames j−1 and j, where shaded rectangles indicate a potential sudden change in the prediction errors. One would expect that the variance of the computed distortion values to the right of a scene cut at row j−1 should be smaller than the variances of the computed distortion values at earlier rows (e.g., j−2 and j−3). This observation can also provide an additional detection rule. As an example, consider the 4×3 sub-array of prediction errors (210), with the $D_{j-1,j}$ value at the lower left corner.

Let $$\omega_{j-3}=\text{variance}\{D_{j-3,j-2},D_{j-3,j-1},D_{j-3,j},D_{j-3,j+1}\}$$

$$\omega_{j-2}=\text{variance}\{D_{j-2,j-1},D_{j-2,j},D_{j-2,j+1},D_{j-2,j+2}\}$$

$$\omega_{j-1}=\text{variance}\{D_{j-1,j},D_{j-1,j+1},D_{j-1,j+2},D_{j-1,j+3}\}, \quad (14a)$$

denote the variances of the prediction errors across each row of this sub-array (210). Then, in an embodiment, a scene cut may be determined if $$\omega_{j-1}<\min\{\omega_{j-2},\omega_{j-3}\}. \quad (14b)$$

In some embodiments, the prediction error variances of equation (14a) and the variance test (14b) may be computed on a reduced window of prediction errors of interest, e.g., using a 4×2, 3×3, or smaller sub-array.

Note that the value of the computed prediction error values or their variances could be very small and hard to use in some scenarios. To solve this numerical issue, one could convert these values to a logarithmic domain. For example, in an embodiment, distortion values $D_{i,k}$ of equation (7) may be expressed in dB as either signal to noise ratio (SNR) or Peak SNR (PSNR) values.

Looking at the array data of FIG. 2A and FIG. 2B as column data, experiments have indicated that for a scene change between frames j−1 and j $$D_{j-1,j}>D_{j,j+i}, \text{ for } i=1,2,3,\ldots k. \quad (15)$$

In an embodiment, one may determine if there is a scene cut if equation (15) is satisfied for a predetermined number of Ts<k frames, e.g., Ts=10. Equation (15) may also be generalized as $$D_{j-t,j}>D_{j-t+1,j+i}, \text{ for } i=1,2,3,\ldots k,$$

where for example, t=1, t=2, t=3, and the like.

Scene change detections may be performed using pixel data from a single color component of the input frames frame (e.g., luminance); however, the accuracy of scene change detection can be improved by using more than one or even all color channels. This is because color grading is typically applied to all color channels. In an embodiment, scene change detection may be performed using a simple majority vote. For example, a scene cut is determined if a criterion detects a scene cut in at least two color channels.

In some embodiments, scene change detections may be performed using input data from more than two color grades (e.g., at 10,000 nits, 5,000 nits, 100 nits, and the like.) For example, given three color grades G1, G2, and G3, preliminary scene cuts may be detected between the G1 and G2 grades, the G1 and G3 grades, and the G2 and G3 grades. Then, a final scene cut is determined if there is a corresponding preliminary scene cut in at least two grading pairs (e.g., GI and G2 and G2 and G3).

From a computation point of view, note that the $B_j$ and $c_j$ data are typically already computed as part of the predictor (140) implementation in the video encoder (100); hence little extra computation is required to implement scene change detection using the proposed approach.

Scene Change Detection Using an Entropy Measure

In another embodiment, scene changes may be detected using an entropy measure of the residual signal between the two input signals. Let $$r_{j,i}=v_{j,i}-s_{j,i},$$

$$r_{j-1,i}=v_{j-1,i}-s_{j-1,i},$$

$$r_{j+1,i}=v_{j+1,i}-s_{j+1,i}, \quad (16)$$

denote the pixel differences in three consecutive frames (j−1, j, and j+1). For each set of pixel differences one may generate their corresponding entropy values. For example, without limitation, in MATLAB one may apply the entropy function.

Let $$E_{j-1} = \text{entropy}\{r_{j-1,i}\}, \quad (17)$$
$$E_{j} = \text{entropy}\{r_{j,i}\},$$
$$E_{j+1} = \text{entropy}\{r_{j+1,i}\},$$

and $$ED_{j-1,j} = \frac{|E_{j-1}-E_j|}{E_j}, \quad (18)$$

$$ED_{j-2,j-1} = \frac{|E_{j-2}-E_{j-1}|}{E_{j-1}},$$

$$ED_{j,j+1} = \frac{|E_j-E_{j+1}|}{E_{j+1}}$$

In an embodiment, a scene change is determined if $$ED_{j-1,j} > T_e, \quad (19)$$

and $$ED_{j-1,j} > \frac{ED_{j-2,j-1}+ED_{j,j+1}}{2}.$$

where $T_e$ is a predetermined threshold (e.g., $T_e$=0.001).

In some embodiments, one may combine the predictor-based method and the entropy-based method to further enhance the detection performance, but at the cost of increased computations.

Figure 3:
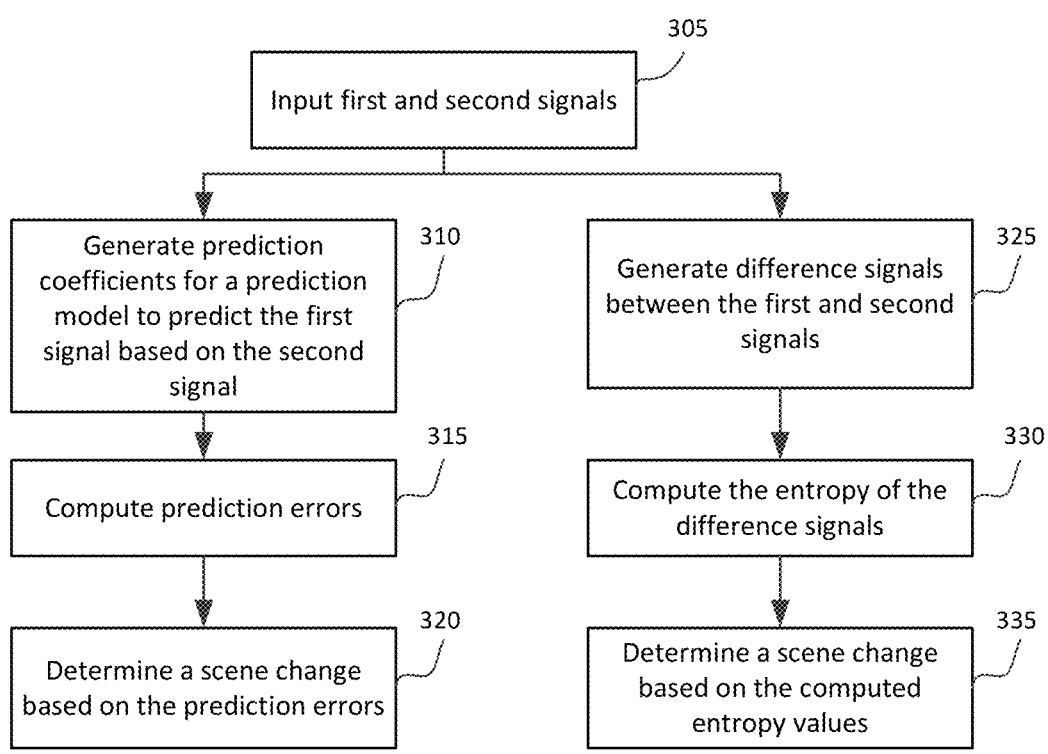
FIG. 3 depicts example scene-change-detection processes based on embodiments of this invention.

FIG. 3 depicts example scene change detection processes based on embodiments of this invention. Steps (310), (315), and (320) depict the scene-detection process based on computed prediction errors and steps (325), (330), and (335) depict the scene detection process based on computed entropy values. Input (305) to either one of the processes (or a combination of the two processes) includes two video signals representing the same scene or content, but at different color grades. For example, the first input may represent a movie color graded at the highest possible dynamic range and the second input may represent the same movie color graded at a lower dynamic range. In some embodiments, this lower dynamic range could also be considered an enhanced dynamic range or could be a standard dynamic range.

In step (310), for a sequence of consecutive frames in both signals, given a prediction model, sets of prediction coefficients are computed to generate predictors to predict the first signal based on the second signal. In some embodiments, this predictor may be part of a layered codec to code and transmit the two signals to a downstream decoder.

Using the prediction model, and the computed prediction model coefficients, as depicted in FIG. 2A and FIG. 2B, a set of prediction errors ($D_{ij}$) may be generated for a sequence of consecutive frames in the first and second signals. Finally, on step (320), a scene change may be determined according to the characteristics of the computed prediction errors. Examples of such scene change determining tests were described earlier in equations (12)-(15). Each of these tests can be performed on their own, or in combination.

In some embodiments, coding may not necessarily include a prediction function between the two input signals. In such cases, it may be more cost-effective to detect scene cuts based on the entropy measure of the difference signal between the first and second signal. As depicted in FIG. 3, after a set of difference signals is generated in step (325) (e.g., using equation (16)), in step (330), their entropy is computed (e.g., using equation (17)), and finally, in step (335), a scene change is detected based on the computed entropy values (e.g., using equations (18) and (19).

Some embodiments may use a combination of scene change detection tests to improve accuracy. For example, a test may use both the entropy test of equation (18) and the prediction-error test of equation (12).

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control or execute instructions relating to scene-change detection, such as those described herein. The computer and/or IC may compute any of a variety of parameters or values that relate to scene-change detection as described herein. The encoding and decoding embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to scene-change detection as described above by executing software instructions in a program memory accessible to the processors. The invention may also be provided in the form of a program product. The program product may comprise any non-transitory medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to scene-change detection are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for scene change detection, the method comprising:
   accessing a first video signal and a second video signal, wherein both the first video signal and the second video signal represent the same video content but at a different color grade;
   for a sequence of consecutive frames in the first and second video signals:
   computing prediction coefficients for a prediction model to generate predicted frames of the first video signal given data of the second video signal;
   computing prediction errors signals between the generated predicted frames and the corresponding frames of the first input signal; and
   determining a scene change in the sequence of the consecutive frames based on the prediction error signals, wherein determining a scene change between frames j−1 and j in the sequence of the consecutive frames based on the prediction error signals further comprises computing whether $$D_{j-1,j} > D_{j,j+i}$$

for i=1, 2, . . . , Ts, where Ts is an integer and $D_{j,k}$ denotes a prediction error computed for the k-th frame in the first video signal using prediction model coefficients computed with data of the first and second video signals up to the j-th frame.

2. The method of claim 1, wherein a different color grade comprises a difference in the dynamic range between the first and second video signals.

3. The method of claim 2, wherein the first video signal has a higher dynamic range than the second video signal.

4. The method of claim 1, wherein determining a scene change in the sequence of the consecutive frames based on the prediction error signals comprises applying a one-dimensional or a two-dimensional edge detection algorithm to the prediction error signals.

5. The method of claim 1, wherein determining a scene change in the sequence of the consecutive frames based on the prediction error signals further comprises:
  computing a first set of prediction coefficients for the prediction model using data of the first and second video signal up-to a first frame (j−1);
  applying the first set of prediction coefficients to the prediction model to generate predicted frames for the first frame and a sequence of frames before and after the first frame;
  generating prediction errors between the generated predicted frames and the corresponding frames in the first video signal; and
  determining a scene change after the first frame if an approximation of a first derivative of samples of the generated prediction errors is larger than a first threshold.

6. The method of claim 5, wherein determining a scene change between frames j−1 (the first frame) and j comprises computing whether $$\theta_1 = \frac{|M_L - M_R|}{\min\{M_L, M_R\}} > T_{ave}$$

is true, where $T_{ave}$ denotes the first threshold, $$M_L = \frac{1}{a}\sum_{i=-a}^{-1} D_{j-a,j+1},$$

$$M_R = \frac{1}{b+1}\sum_{i=0}^{b} D_{j-1,j+i},$$

where a denotes the total number of frames used before the first frame and b denotes the total number of frames used after the first frame, and $D_{j,k}$ denotes a prediction error computed for the k-th frame of the first video signal using prediction model coefficients computed with data of the first and second video signals up to frame j.

7. The method of claim 1 wherein determining a scene change between frames j−1 and j in the sequence of the consecutive frames based on the prediction error signals further comprises computing whether:

$$|D_{j-3,j-1} - D_{j-3,j}| > \max\{|D_{j-3,j-2} - D_{j-3,j-1}|, |D_{j-3,j} - D_{j-3,j+1}|\}$$

$$\&\& \ |D_{j-2,j-1} - D_{j-2,j}| > \max\{|D_{j-2,j-2} - D_{j-2,j-1}|, |D_{j-2,j} - D_{j-2,j+1}|\}$$

$$\&\& \ |D_{j-1,j-1} - D_{j-1,j}| > \max\{|D_{j-1,j-2} - D_{j-1,j-1}|, |D_{j-1,j} - D_{j-1,j+1}|\}$$

$$\&\& \ |D_{j,j-1} - D_{j,j}| > \max\{|D_{j,j-2} - D_{j,j-1}|, |D_{j,j} - D_{j,j+1}|\},$$

is true, where $D_{j,k}$ denotes a prediction error computed for the k-th frame in the first video signal using prediction model coefficients computed with data of the first and second video signals up to the j-th frame.

8. The method of claim 1 wherein determining a scene change between frames j−1 and j in the sequence of the consecutive frames based on the prediction error signals further comprises computing whether $$\omega_{j-1} < \min\{\omega_{j-2}, \omega_{j-3}\}$$

is true, where $$\omega_{j-3} = \text{variance}\{D_{j-3,j-2}, D_{j-3,j-1}, D_{j-3,j}, D_{j-3,j+1}\}$$

$$\omega_{j-2} = \text{variance}\{D_{j-2,j-1}, D_{j-2,j}, D_{j-2,j+1}, D_{j-2,j+2}\}$$

$$\omega_{j-1} = \text{variance}\{D_{j-1,j}, D_{j-1,j+1}, D_{j-1,j+2}, D_{j-1,j+3}\},$$

and $D_{j,k}$ denotes a prediction error computed for the k-th frame in the first video signal using prediction model coefficients computed with data of the first and second video signals up to the j-th frame.

9. The method of claim 1, wherein the computed prediction errors are translated to a logarithmic domain before being applied to determine the scene change.

10. The method of claim 1, wherein computing the prediction coefficients for the prediction model comprises applying the prediction model across a sliding window of input frame data.

11. The method of claim 1, wherein the first video signal and the second video signal comprise three or more color channels and the steps to determine the scene change further comprise:
  making a preliminary determination whether there is a scene change in the sequence of the consecutive frames for each of the color channels of the first and second video signals according to the steps of claim 1; and
  making a final determination whether there is a scene change if the same scene change is preliminary determined in the majority of the three or more color channels.

12. The method of claim 1, further comprising:
  accessing a third video signal representing the same video content as the first and second video signals but at a color grade different than the color grades of the first and second video signals;
  making a first preliminary determination whether there is a scene change in the sequence of the consecutive frames between the first and second video signals according to the steps of claim 1;
  making a second preliminary determination whether there is a scene change in the sequence of the consecutive frames between the first and third video signals according to the steps of claim 1, wherein the second video signal is the third video signal; and
  making a final determination whether there is a scene change if a scene change in the first preliminary determination matches a scene change in the second preliminary determination.

13. The method of claim 1, further comprising:
accessing a third video signal representing the same video content as the first and second video signals but at a color grade different than the color grades of the first and second video signals;
making a first preliminary determination whether there is a scene change in the sequence of the consecutive frames between the first and second video signals according to the steps of claim 1;
making a second preliminary determination whether there is a scene change in the sequence of the consecutive frames between the first and third video signals according to the steps of claim 1, wherein the second video signal is the third video signal;
making a third preliminary determination whether there is a scene change in the sequence of the consecutive frames between the second and third video signals according to the steps of claim 1, wherein the first video signal is the third video signal; and
making a final determination whether there is a scene change if the same scene change is determined in the majority of the preliminary determination steps.

14. An apparatus comprising a processor and configured to perform the method recited in claim 1.

15. A non-transitory computer-readable storage medium having stored thereon computer-executable instructions for executing a method with a processor in accordance with claim 1.

\* \* \* \* \*